(12) United States Patent
Unruh

(10) Patent No.: US 11,378,157 B2
(45) Date of Patent: Jul. 5, 2022

(54) DRIVE BELT HAVING A PROFILED BELT REAR SIDE

(71) Applicant: ContiTech Antriebssysteme GmbH, Hannover (DE)

(72) Inventor: Axel Unruh, Hannover (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 336 days.

(21) Appl. No.: 16/643,274

(22) PCT Filed: Jun. 4, 2018

(86) PCT No.: PCT/EP2018/064545
§ 371 (c)(1),
(2) Date: Feb. 28, 2020

(87) PCT Pub. No.: WO2019/048090
PCT Pub. Date: Mar. 14, 2019

(65) Prior Publication Data
US 2020/0347909 A1 Nov. 5, 2020

(30) Foreign Application Priority Data
Sep. 6, 2017 (DE) .................... 10 2017 215 654.6

(51) Int. Cl.
*F16G 5/20* (2006.01)
*F16G 1/28* (2006.01)
(Continued)

(52) U.S. Cl.
CPC ................ *F16G 5/20* (2013.01); *F16G 1/28* (2013.01); *B29K 2021/00* (2013.01); *B29L 2031/7094* (2013.01); *F16G 5/06* (2013.01)

(58) Field of Classification Search
CPC ..... F16G 5/20; F16G 1/28; F16G 1/10; F16G 5/08; F16H 7/023; F16H 7/02
(Continued)

(56) References Cited

U.S. PATENT DOCUMENTS 3,050,178 A  *  8/1962  Stone ..................... B65G 23/06
                                                    198/834
3,981,206 A  *  9/1976  Miranti, Jr. ............... F16G 5/20
                                                    474/271
(Continued)

FOREIGN PATENT DOCUMENTS

CN      101558251 A      10/2009
CN      202301741 U       7/2012
(Continued)

OTHER PUBLICATIONS

International Search Report dated Nov. 15, 2018 of International Application PCT/EP2018/064545 on which this application is based.

*Primary Examiner* — Henry Y Liu
(74) *Attorney, Agent, or Firm* — David L. Cate; Gregory Adams

(57) ABSTRACT

Drive belt having a belt rear side which is provided for driving auxiliary units, in particular V-ribbed belt, wherein the belt rear side is profiled and is preferably provided with an embossed profile, wherein the profile of the rear-side surface of the drive belt has a multiplicity of projections in the shape of truncated pyramids, the height h of which is less than 1 mm, and is preferably in macroscopic orders of magnitude where $h \leq 0.2$ mm, wherein the base areas $A_G$ of the projections in the shape of truncated pyramids have an area of $\leq 1.0$ mm$^2$ and the top surfaces $A_D$ have an area of $\leq 0.8$ mm$^2$.

8 Claims, 3 Drawing Sheets

(51) Int. Cl.
*B29K 21/00* (2006.01)
*B29L 31/00* (2006.01)
*F16G 5/06* (2006.01)

(58) Field of Classification Search
USPC .............. 474/237, 238, 249, 205, 252, 265
See application file for complete search history.

(56) References Cited

U.S. PATENT DOCUMENTS

| | | | | |
|---|---|---|---|---|
| 4,276,039 A * | 6/1981 | Takano | ..................... | F16G 5/08 |
| | | | | 474/267 |
| 4,311,474 A * | 1/1982 | Standley | ................ | B29D 29/08 |
| | | | | 156/137 |
| 4,449,958 A | 5/1984 | Conrad | | |
| 4,493,681 A * | 1/1985 | Takano | ..................... | F16G 5/20 |
| | | | | 474/250 |
| 4,530,684 A * | 7/1985 | Miranti, Jr. | .......... | B29D 29/106 |
| | | | | 474/264 |
| 4,579,548 A * | 4/1986 | Howerton | ................ | F16G 5/20 |
| | | | | 474/266 |
| 4,702,729 A | 10/1987 | Tanaka et al. | | |
| 4,773,895 A * | 9/1988 | Takami | ..................... | F16G 5/20 |
| | | | | 474/263 |
| 4,781,664 A * | 11/1988 | Imamura | .................. | F16H 7/02 |
| | | | | 474/252 |
| 4,884,998 A * | 12/1989 | Miranti, Jr. | ............. | F16H 7/023 |
| | | | | 156/137 |
| 4,938,736 A * | 7/1990 | Miranti, Jr. | ............. | F16H 7/023 |
| | | | | 156/137 |
| 4,976,662 A * | 12/1990 | Miranti, Jr. | ................ | F16G 1/28 |
| | | | | 156/137 |
| 5,055,090 A * | 10/1991 | Miranti, Jr. | ................ | F16G 1/28 |
| | | | | 474/250 |
| 5,211,608 A * | 5/1993 | Wong | ..................... | F16H 7/023 |
| | | | | 474/202 |
| 5,215,504 A * | 6/1993 | Wong | ........................ | F16G 1/28 |
| | | | | 474/237 |
| 5,413,538 A * | 5/1995 | Mishima | .................. | F16G 1/28 |
| | | | | 474/263 |
| 5,415,594 A * | 5/1995 | Kitahama | ................. | F16G 5/20 |
| | | | | 474/263 |
| 5,447,476 A * | 9/1995 | White, Jr. | ................. | F16G 5/20 |
| | | | | 474/267 |
| 5,492,507 A * | 2/1996 | Kumazaki | ............... | B24B 19/03 |
| | | | | 474/237 |
| 5,624,338 A * | 4/1997 | Kawashima | ............. | F16G 5/20 |
| | | | | 474/263 |
| 5,643,118 A * | 7/1997 | Basse | ........................ | F16G 1/28 |
| | | | | 474/237 |
| 5,704,862 A * | 1/1998 | Janne | ........................ | F16G 5/20 |
| | | | | 474/247 |
| 5,753,369 A * | 5/1998 | Kawashima | ............. | F16G 5/20 |
| | | | | 428/397 |
| 5,779,584 A * | 7/1998 | Noguchi | .................. | F16G 5/20 |
| | | | | 474/237 |
| 6,103,349 A * | 8/2000 | Matsumoto | ............... | F16G 1/00 |
| | | | | 428/167 |
| 6,558,282 B2 * | 5/2003 | Danhauer | ................. | F16G 5/20 |
| | | | | 474/266 |
| 6,620,068 B2 * | 9/2003 | Ito | ............................. | F16G 5/20 |
| | | | | 474/251 |
| 7,008,341 B2 * | 3/2006 | Wilson | ..................... | F16G 5/20 |
| | | | | 474/205 |
| 8,262,523 B2 * | 9/2012 | Kanzow | ................. | D04B 21/18 |
| | | | | 474/268 |
| 9,464,686 B2 * | 10/2016 | Kusano | ................. | B29D 29/103 |
| 10,151,374 B2 * | 12/2018 | Kusano | .................. | B29C 59/02 |
| 2001/0019936 A1 * | 9/2001 | Hayashi | ................. | B29D 29/103 |
| | | | | 451/51 |
| 2002/0013192 A1 * | 1/2002 | Ito | ............................ | F16G 5/20 |
| | | | | 474/251 |
| 2004/0014544 A1 * | 1/2004 | Ito | ............................ | F16G 5/20 |
| | | | | 474/251 |
| 2007/0023127 A1 * | 2/2007 | Onita | ........................ | F16G 5/20 |
| | | | | 474/237 |
| 2009/0105027 A1 * | 4/2009 | Takahashi | ................. | F16G 1/08 |
| | | | | 474/249 |
| 2009/0149289 A1 * | 6/2009 | Cheong | ..................... | F16G 5/06 |
| | | | | 474/263 |
| 2010/0203993 A1 * | 8/2010 | Matsukawa | ............... | F16G 5/20 |
| | | | | 474/251 |
| 2010/0216583 A1 * | 8/2010 | Westelaken | ............... | F16G 5/20 |
| | | | | 474/238 |
| 2011/0285388 A1 * | 11/2011 | Tomioka | ................ | B29D 29/10 |
| | | | | 156/137 |
| 2014/0364262 A1 | 12/2014 | Mori et al. | | |
| 2015/0024892 A1 * | 1/2015 | Hineno | ................... | B29C 35/02 |
| | | | | 474/237 |
| 2015/0148163 A1 * | 5/2015 | Kusano | ..................... | F16G 1/10 |
| | | | | 264/293 |
| 2015/0211601 A1 | 7/2015 | Kusano | | |
| 2016/0010722 A1 * | 1/2016 | Kim | ........................ | F16G 1/10 |
| | | | | 474/271 |
| 2016/0348754 A1 | 8/2016 | Kusano | | |
| 2016/0273616 A1 * | 9/2016 | Takehara | ............. | B29D 29/103 |
| 2019/0062118 A1 * | 2/2019 | Valjus | ..................... | B66B 7/062 |

FOREIGN PATENT DOCUMENTS

| | | |
|---|---|---|
| CN | 104508322 A | 4/2015 |
| DE | 2061401 A1 | 6/1972 |
| DE | 102013105333 A1 | 11/2014 |
| DE | 112013003788 T5 | 5/2015 |
| EP | 0232575 A1 | 8/1987 |
| EP | 1787045 A1 | 5/2007 |
| GB | 2124729 A | 2/1984 |
| WO | 8301056 A1 | 3/1983 |
| WO | 2005054713 A1 | 6/2005 |

* cited by examiner

DRIVE BELT HAVING A PROFILED BELT REAR SIDE

The invention relates to a drive belt having a belt rear side which is provided for driving auxiliary units, in particular a V-ribbed belt, wherein the belt rear side is profiled, preferably is provided with an embossed profile. The invention further relates to a molding method for producing such a drive belt having a backing profile.

Belt transmissions nowadays are to be found in a multiplicity of drive constellations and represent a simple and effective possibility for transmitting force. Belt transmissions have been known for a long time in particular in motor vehicle engines and are used, for example, for driving control mechanisms, camshafts, and water pumps. V-ribbed belts (poly-V-belts) which on the profile side thereof, that is to say the rib side thereof, can transmit particularly high torques on account of high coefficients of friction in the wrapping friction are often used herein.

However, belt transmissions nowadays increasingly have to be capable of driving further units by way of the rear side of said belt transmissions. The drive of a water pump in a motor vehicle engine is thus a typical example of driving by way of the belt rear side.

It is important herein that not only the belt front side, thus the profiled side, has a sufficiently high coefficient of friction for transmitting high torques, but that this applies also in the case of the belt rear side and of the rear-side bending and wrapping of a rear roller.

EP 1 787 045 B1 discloses a belt transmission having a drive belt which is configured as a V-ribbed belt, the rear side of said drive belt being embossed in order for more friction to be achieved. The associated rear roller, or the friction wheel, respectively, is additionally provided with more or less encircling grooves in order to enable the drainage of water.

The embossing of the belt rear side is to be configured as a relief pattern which is not specified in more detail here, or to configure grooves on the belt backing which are likewise not described in more detail, the magnitude or depth, respectively, of said grooves being in the range of 1 mm. Said embossing can be produced either by subtractive machining, which is complex and environmentally polluting, or by embossing during the vulcanization. The embossing during the vulcanization herein is carried out using an internal tool which on the external side thereof is provided with a woven-fabric coating. Said woven-fabric coating is then impressed into the vulcanizing blank and later, that is to say upon vulcanizing, singularizing and turning inside-out, appears on the belt backing.

It appears disadvantageous herein that not only the subtractive machining but also the embossing during the vulcanization have to be carried out by a particular tool. Moreover, a rather random embossed pattern is created on account of a woven-fabric coating as the negative, said rather random embossed pattern in terms of the coefficient of friction thereof certainly not yet being optimized.

Drive belts configured as V-ribbed belts are usually cut as rings from a cylindrical or tubular, respectively, V-ribbed blank, the length of the latter corresponding to a multiple of the belt width. After the individual rings have been cut off from the V-ribbed blank, the rings are "turned inside-out", such that the side of said rings that is profiled in a "ribbed" manner lies on the internal side. The drive belt, commonly referred to as V-ribbed belt or multi-rib V-belt, is thus obtained, said drive belt, by way of profiled internal side thereof, driving belt pulleys of complementary design, and optionally tension rollers or further drives being connected in a force-fitting manner to the rear side of said drive belt.

In the production of the V-ribbed blank, a distinction is again substantially made between two methods, specifically the subtractive grinding method and the non-subtractive molding method.

In the grinding method, a V-ribbed blank with a smooth surface upon completed vulcanization and prior to the cutting-off of the rings, is subjected to material-subtracting machining (grinding), on account of which the ribbed profile is incorporated/ground on the external side of said V-ribbed blank, specifically into the so-called substructure.

In the molding method, the ribbed profile of the V-ribbed blank is already generated during the vulcanization, specifically by a cylindrical vulcanizing mold into which the V-ribbed blank is impressed prior to, or during, respectively, vulcanizing, said cylindrical vulcanizing mold on the internal side thereof having the negative of the ribbed profile.

In the molding method for producing V-ribbed belts, the construction of the V-ribbed blank usually takes place first on a so-called belt construction drum. With a view to the further manufacturing process and the "turning inside-out" after cutting/singularizing, it is self-evidently firstly necessary for the rear side of the belt, specifically the so-called top ply, to be built up on said drum. The latter may be constructed in one or two layers and provided with various additives or coatings.

The so-called "tensile cord" composed of one or more reinforcements is then applied to said top ply. The reinforcements are usually composed of one or a plurality of fibers, threads, or cords which are wrapped or twisted about one another, and in more or less tight windings are wound in one or a plurality of plies across the entire width of the belt construction drum. In the finished belt, the reinforcements are significant in terms of the transmission of tensile force and in this instance are situated in the regions between the top ply and the substructure which will be described below.

The so-called "substructure" or main body of the V-ribbed belt, that is to say the region which later has the ribbed profile and possibly also a minor further layer thickness, is applied to the tensile cord. Here, the substructure is applied in the form of a thin board composed of elastomer material/rubber, the width of said board corresponding to the length of the belt construction drum, and the length of said board corresponding approximately to the circumference of the belt construction drum. The ends of said plate can be easily joined together when in the still-tacky state.

Finally, a woven-fabric ply which provides special characteristics for the finished V-ribbed belt in the profiled region, for example contributes to noise or friction reduction, is optionally applied. The woven-fabric ply thus completes the V-ribbed blank.

The thus produced non-vulcanized V-ribbed blank, thus the composite of top ply, tensile cord and substructure and possibly woven-fabric ply, is then inserted into the cylindrical vulcanizing mold, which is of slightly greater diameter, such that the substructure or the woven-fabric ply faces toward the inner side, provided with a negative of the ribbed profile, of the vulcanizing mold.

A sleeve/heating sleeve composed of rubber, and corresponding installations for expanding the sleeve and for heating of the latter, usually infeeds and installations for impinging the sleeve with compressed air and for impinging the usually double-walled vulcanizing mold with hot steam, are then inserted into the internal cavity of the vulcanizing mold and of the V-ribbed blank.

The sleeve is then expanded by way of the hot steam, bears against the top ply and presses the entire V-ribbed blank into the surrounding negative of the vulcanizing mold, on account of which the outer layers of the V-ribbed blank, specifically the substructure, is pressed into the negative and is thus provided with a "molded" ribbed profile.

It has already been mentioned above that the rear side of such a multi-ribbed belt is likewise utilized for driving belt pulleys, for example for driving a water pump of a motor vehicle engine. Accordingly, higher requirements are also set in terms of the configuration of the belt rear side and the coefficients of friction that can be achieved thereon.

Furthermore observing the production of a V-ribbed belt by the molding method, it becomes evident that the surface and the configuration of the belt backing can be determined by the external surface of the sleeve used in the cavity of the vulcanizing mold when no further subtractive machining procedures are envisaged. In this case, said sleeve, which presses the V-ribbed blank by way of the external side thereof into the surrounding negative of the vulcanizing mold, solely by way of the external surface of said sleeve molds or embosses, respectively, the internal surface of the V-ribbed blank and thus the belt rear side of the belts which are singularized after subsequent cutting and turning inside-out.

The sleeve per se is usually produced on a mandrel, is vulcanized thereon, then said sleeve itself is likewise turned inside-out and is used as a heating sleeve in the above-mentioned production process for the V-ribbed blank. After the procedure of turning the sleeve inside-out, the internal surface which has been vulcanized on the mandrel thus forms the external side of said sleeve.

EP 0 232 575 B1 discloses a solution for providing a high coefficient of friction on the belt front side as well as on the belt rear side, in which solution a drive belt provided with a ribbed profile on both sides is proposed. The ribs on the rear side herein have transverse grooves which enable the rearward bending about a rear roller and are intended to limit said rearward bending such that a reliable operation is enabled and a very high coefficient of friction is nevertheless achieved for driving on the rear. However, such a configuration requires a relatively complicated production and increases the material consumption and the weight of the belt.

Since the belt backing thus increasingly assumes a driving function, the coefficient of friction (CoF, measured according to SAE J2432, for instance) is relevant. The transmission of force and torque by the belt backing is determined by the wrapping and the contact pressure force on the drive wheel, that is to say on the rear roller in this case. The coefficient of friction is moreover characterized by the material pairings of the rollers and the belt. For reasons of savings in terms of energy or CO2 emissions, respectively, it is nowadays commonplace for the pre-tensioning force in the transmission to be reduced. A transmission of force by way of the belt backing is thus no longer able to be readily influenced by way of the contact pressure force/normal force, but rather henceforth only by way of the coefficient of friction.

The object of the invention thus lies in providing a drive belt which in the usual construction and in a lightweight construction mode offers the possibility for further units to be reliably driven by way of rear rollers and which from the outset permits high coefficients of friction to be implemented and consequently can transmit high drive torques over the entire service life of said drive belt.

This object is achieved by a drive belt having the features of the main claim. The invention also relates to a particularly suitable molding method for producing drive belts, in particular V-ribbed belts, as claimed in the independent method claim.

Further advantageous configurations are disclosed in the respective dependent claims.

The drive belt on the rear-side surface thereof herein is provided with a profile which includes a multiplicity of truncated pyramidal projections, the height h of which is less than 1 mm, preferably is configured in macroscopic magnitudes with h≤0.2 mm, wherein the base areas $A_G$ of the truncated pyramidal projections have an area of ≤1.0 mm$^2$ and the roof areas $A_D$ have an area of ≤0.8 mm$^2$.

On account of such a configuration of the rear-side surface of a drive belt, an unexpected improvement of the coefficient of friction CoF is achieved when driving by way of the belt rear side, that is to say a significantly improved transmission of torque and force during the wrapping of rear rollers. The pre-tensioning force can thus be reduced without decreasing the drive output.

This is associated with a further extraordinarily advantageous effect which lies in that the coefficient of friction in terms of the connection between the belt rear side and the rear roller is already very high from the outset, that is to say from fitting or bringing to bear, respectively, the new belt and remains identical over the entire service life of the belt. This advantageously leads to the previously usual "running-in effects" no longer arising, and a transmission of output that is consistent from the outset when driving a rear roller can be taken into account and planned.

One advantageous refinement lies in that the truncated pyramidal projections are configured as straight quadrilateral truncated pyramids having base areas and roof areas which are disposed so as to be substantially parallel. This achieves the positive effects already mentioned above, and moreover simplifies the production. Of course, any other form of truncated pyramid as a profile can be applied to the belt backing, but in terms of configuring an increased coefficient of friction, it is important that base areas and roof areas are configured so as to be substantially parallel.

One further advantageous configuration lies in that the truncated pyramidal projections on the belt rear side, while taking into account usual production tolerances, have a height of 0.15 mm. This parameter, in particular when interacting with one further advantageous configuration which lies in that the truncated pyramidal projections, while taking into account usual production tolerances, have a base area $A_G$ of 0.8 mm×0.8 mm and a roof area $A_D$ of 0.6 mm×0.6 mm, lead to an improvement in the coefficient of friction of up to 25% in comparison to profiles from the prior art, or non-profiled belt backings.

A molding method in which the profile of the belt rear side is already produced during the vulcanizing of the belt is particularly suitable for producing such a drive belt having a belt rear side which is provided for driving auxiliary units. In such a production method, a drive belt blank as a composite of a top ply, a tensile cord, and a substructure, and optionally a woven-fabric ply, is first produced on a belt-construction drum and thereafter is incorporated in a cylindrical vulcanizing mold which in terms of diameter is somewhat larger such that the substructure faces the internal side of the vulcanizing mold that is provided with a negative of the drive-side profile, as already described above.

Thereafter, a sleeve/heating sleeve which is composed of rubber is introduced into the internal cavity of the vulcanizing mold and of the not yet vulcanized drive belt blank and while supplying compressed air and/or a heating medium is expanded such that said sleeve/heating sleeve bears internally on the drive belt blank and presses the latter into the surrounding negative of the vulcanizing mold, on account of which the external layer of the drive belt blank, specifically the substructure, is pushed into the negative and is thus provided with the profile of said negative.

The external surface of the sleeve then forms the embossing negative for the surface of the belt backing, or the later belt rear side, respectively. Consequently, the external surface of the sleeve has to be designed already in the production of the latter such that the belt rear side is imparted the profile during vulcanizing, said profile rendering the belt capable of driving also drive rollers which are encircled or wrapped on the rear side, respectively.

The particular configuration according to the invention of the method known to this extent now lies in that the sleeve prior thereto is produced on a preferably metallic mandrel, the external side of said mandrel having the profile of the rear-side surface of the drive belt in the form of a multiplicity of truncated pyramidal projections. The material for producing the sleeve, most typically an elastomer, preferably rubber, herein is wound onto the mandrel in a plurality of overlapping plies, and subsequently is vulcanized on the mandrel under external pressure, on account of which the tubular sleeve, which on the internal side thereof is imparted the rear-side profile of the belt backing, is created.

The sleeve upon completion of the vulcanizing is finally removed from the mandrel, then turned inside-out and in the above-mentioned manner is inserted into the internal cavity of the vulcanizing mold and of the not yet vulcanized drive belt blank.

The profile of the external surface of the mandrel in terms of the geometric configurations and dimensions thereof thus corresponds to the profile that is ultimately present on the belt rear side, specifically includes a multiplicity of truncated pyramidal projections, the height h of which is less than 1 mm, preferably is configured in macroscopic magnitudes, with h≤0.2 mm, wherein the base areas $A_G$ of the truncated pyramidal projections have an area of ≤1.0 mm² and the roof areas $A_D$ have an area of ≤0.8 mm².

No additional internal tool is thus required in such a method for producing belts by a molding method, but the sleeve which is required in any case is utilized for pressing the drive belt blank into the surrounding negative of the vulcanizing mold so as to also mold the belt backing profile of the drive belt blank in the same operating step.

Such a profile can be produced in a particularly simple and thus advantageous manner in that the mandrel surface is first knurled and then ground. These are usual and easily managed processing methods for metallic surfaces. On account of the modification, pyramids, or relatively pointed pyramidal members/truncated pyramids are first created, which thereafter are rendered to the desired dimensions by way of the grinding method.

The invention is to be explained in greater detail by means of an exemplary embodiment.

IN THE DRAWINGS

FIG. 1 shows an enlarged fragment from the profile 1 of the belt backing of a drive belt according to the invention.

Figure 1:
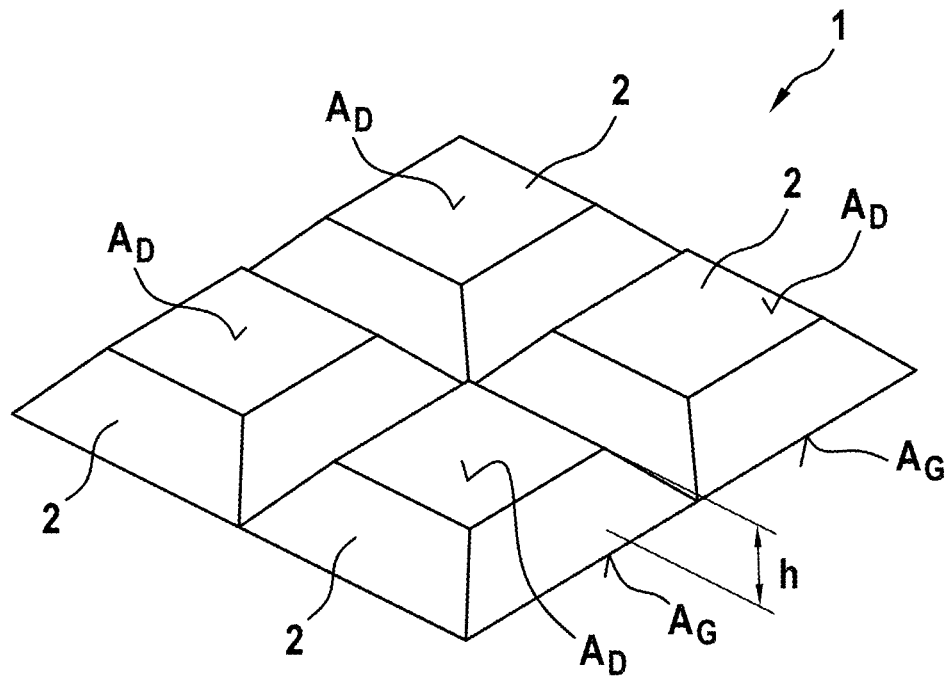
FIG. 1 shows an enlarged fragment from the backing profile of a drive belt according to the invention.
Figure 2:
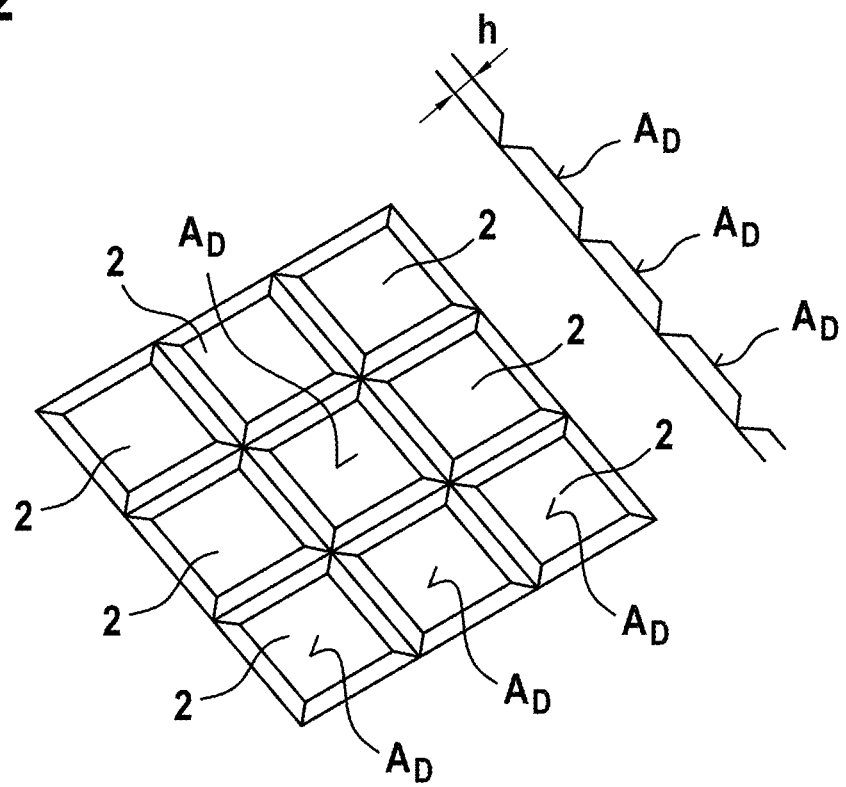
FIG. 2 shows an enlarged drawn illustration of a fragment of the backing profile as per FIG. 1.

When viewed together with FIG. 2, which corresponds to a manufacturing drawing of the rear face in the plan view and sectional view, it can be seen that the profile of the rear-side surface of the drive belt according to the invention has a multiplicity of truncated pyramidal projections 2 having a height h of 0.15 mm. These here are straight quadrilateral truncated pyramids having base areas $A_G$ and roof areas $A_D$ which are disposed so as to be substantially parallel.

The height h of 0.15 mm can just be seen with the naked eye, so that this here relates to a macroscopic magnitude. Despite the term "macroscopic" per se being relative, of course, in many technical fields such magnitudes (small, but within the range still visible to the naked eye) are considered to be comprised by said term.

The base areas $A_G$ of the respective truncated pyramidal projections here have an area of 0.8 mm×0.8 mm, thus approximately 0.64 mm², while the roof areas $A_D$ have an area of 0.6 mm×0.6 mm, thus approximately 0.36 mm².

Figure 3:
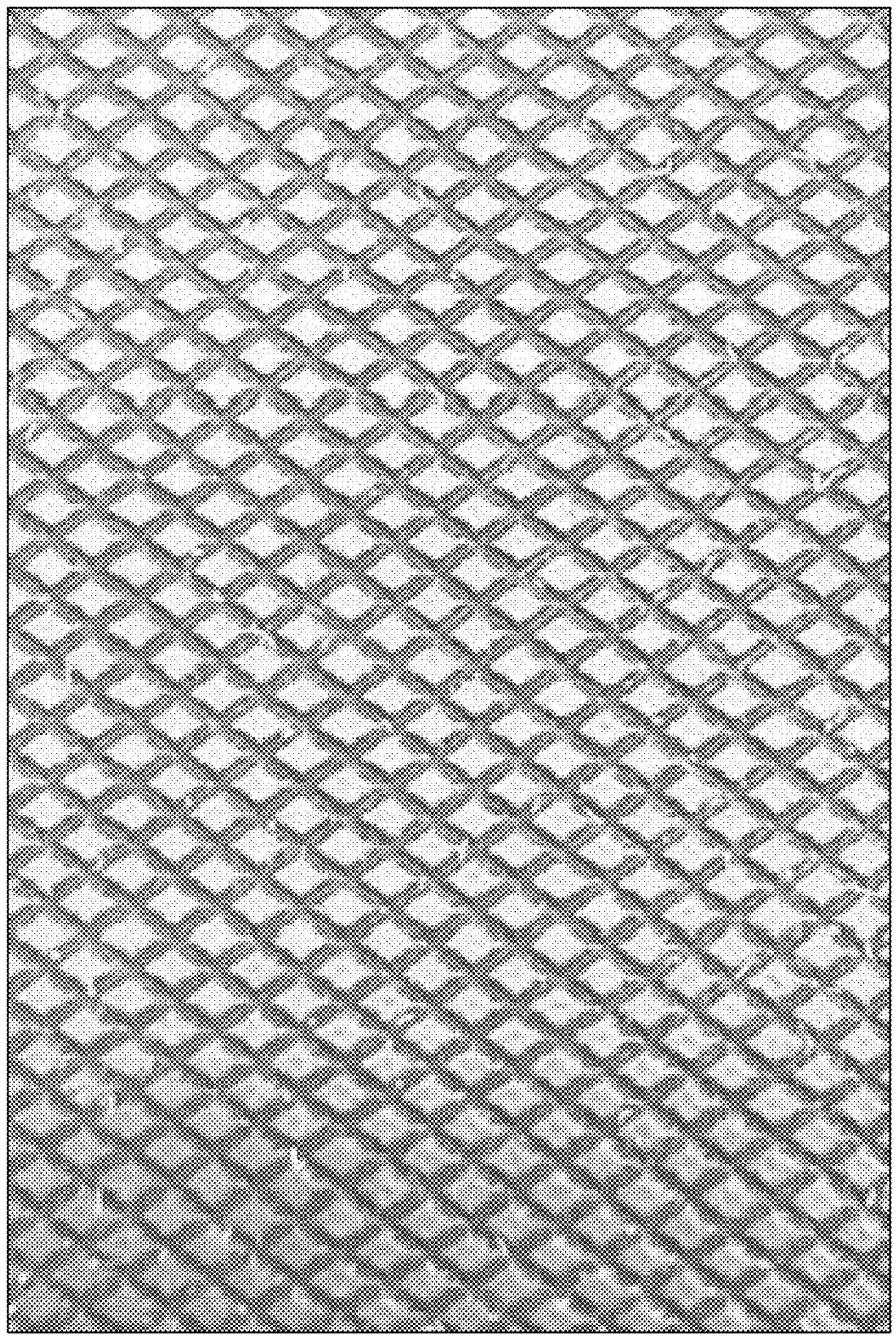
FIG. 3 shows a photograph of a real enlarged surface fragment of the belt rear side according to the invention.

FIG. 3 shows a photograph which illustrates the real appearance of a fragment of the surface of the rear side of a belt according to the invention, albeit enlarged by approx. 3.5 times. Here too, the profile of the rear-side surface of the drive belt according to the invention can be identified as a multiplicity of truncated pyramidal projections.

Figure 4:
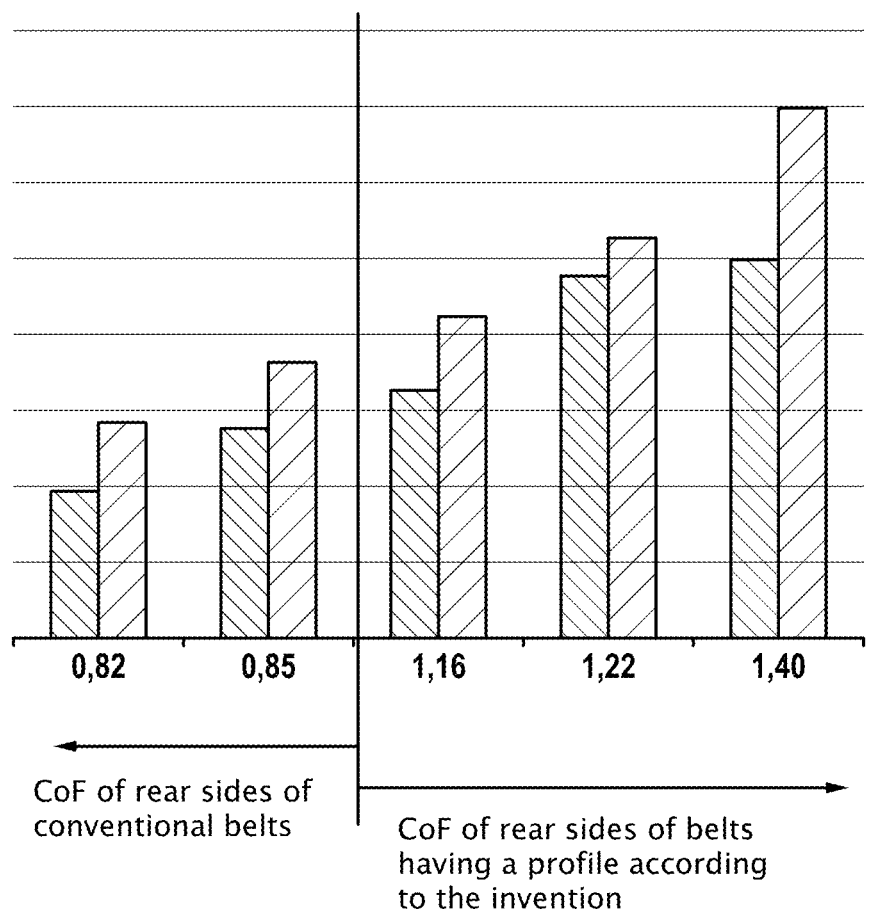
FIG. 4 for comparison shows a diagram of the coefficients of friction CoF of conventional belt backings and belt backings according to the invention.

FIG. 4 shows a diagram which shows the comparison of the coefficients of friction CoF according to SAE J2432 of conventional belt backing and those with the profile according to the invention, measured directly after bringing to bear a new belt. The mean values from 20 measured belts of one type have in each case been evaluated and plotted. It can be clearly seen here that the coefficients of friction illustrated on the left side, being those of rear side of conventional belts from the prior art, are significantly below those of the belts having the profile according to the invention.

LIST OF REFERENCE SIGNS (Part of the Description)
1 Fragment of the profile of a belt backing
2 Truncated pyramidal projection
$A_G$ Base area
$A_D$ Roof area
h Height of the truncated pyramidal projection

The invention claimed is:

1. A drive belt comprising a belt rear side which is provided for driving auxiliary units, wherein the belt rear side is profiled, wherein the profile of the rear-side surface of the drive belt has a multiplicity of truncated pyramidal projections, wherein height (h) of the truncated pyramidal projections is less than 1 mm, and wherein the truncated pyramidal projections, while taking into account usual production tolerances, have a base area ($A_G$) of 0.8 mm×0.8 mm and a roof area ($A_D$) of 0.6 mm×0.6 mm.

2. The drive belt as claimed in claim 1, wherein the drive belt is a V-ribbed belt.

3. The drive belt as claimed in claim 1, wherein the belt rear side is provided with an embossed profile.

4. The drive belt as claimed in claim 1, wherein the truncated pyramidal projections are configured in macroscopic magnitudes with height (h)≤0.2 mm.

5. The drive belt as claimed in claim 1, wherein the truncated pyramidal projections are configured as straight quadrilateral truncated pyramids having base areas ($A_G$) and roof areas ($A_D$) which are disposed so as to be substantially parallel.

6. The drive belt as claimed in claim 1, wherein the truncated pyramidal projections on the belt rear side, while taking into account usual production tolerances, have a height (h) of 0.15 mm.

7. A method for producing a drive belt having a belt rear side which is provided for driving auxiliary units, as claimed in claim 1, by a molding method in which a drive belt blank as a composite of a top ply, a tensile cord, and a substructure, and optionally a woven-fabric ply, is first produced on a belt-construction drum, thereafter is incorporated in a cylindrical vulcanizing mold which in terms of diameter is somewhat larger such that the substructure faces the internal side of the vulcanizing mold that is provided with a negative of the drive-side profile;

wherein a sleeve/heating sleeve which is composed of rubber is introduced into the internal cavity of the vulcanizing mold and of the not yet vulcanized drive belt blank and while supplying compressed air and/or a heating medium is expanded such that said sleeve/heating sleeve bears internally on the drive belt blank and presses the latter into the surrounding negative of the vulcanizing mold, on account of which the external layer of the drive belt blank, specifically the substructure, or the woven-fabric ply, respectively, is pushed into the negative and is thus provided with the profile of said negative;

wherein the sleeve prior thereto is produced on a metallic mandrel, the external side of said mandrel having the profile of the rear-side surface of the drive belt in the form of a multiplicity of truncated pyramidal projections;

wherein the truncated pyramidal projections on the mandrel surface have a height (h) of 0.15 mm, a base area ($A_G$) of 0.8 mm×0.8 mm, and a roof area ($A_D$) of 0.6 mm×0.6 mm;

wherein the material for producing the sleeve, in a plurality of tiers of an elastomer, is wound onto the mandrel and subsequently is vulcanized on the mandrel under external pressure, on account of which the sleeve on the internal side thereof is imparted the rear-side profile of the belt backing; and, wherein the sleeve upon completion of vulcanizing finally removed from the mandrel, then turned inside-out and in the above-mentioned manner is inserted into the internal cavity of the vulcanizing mold and of the not yet vulcanized drive belt blank.

8. The method as claimed in claim 7, wherein the mandrel for producing the profile in the form of a multiplicity of truncated pyramidal projections situated on the external side of the mandrel is first knurled and then ground.

* * * * *